United States Patent
Sahoo et al.

(10) Patent No.: US 10,476,956 B1
(45) Date of Patent: Nov. 12, 2019

(54) ADAPTIVE BULK WRITE PROCESS

(71) Applicant: Juniper Networks, Inc., Sunnyvale, CA (US)

(72) Inventors: Debi Prasad Sahoo, San Jose, CA (US); Ajay V Gaonkar, San Jose, CA (US); Eswaran Srinivasan, Fremont, CA (US); Madhu N. Kopalle, Cupertino, CA (US); SelvaKumar Sivaraj, Sunnyvale, CA (US); Rajagopalan Subbiah, San Jose, CA (US); MooJin Jeong, Seoul (KR); Ming Qiao, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 774 days.

(21) Appl. No.: 14/986,266

(22) Filed: Dec. 31, 2015

(51) Int. Cl.
*G06F 15/167* (2006.01)
*H04L 29/08* (2006.01)
*H04L 12/721* (2013.01)

(52) U.S. Cl.
CPC .......... *H04L 67/1097* (2013.01); *H04L 45/70* (2013.01); *H04L 69/324* (2013.01)

(58) Field of Classification Search
CPC ....................................................... H04L 45/70
See application file for complete search history.

(56) References Cited

U.S. PATENT DOCUMENTS

| | | | | |
|---|---|---|---|---|
| 9,753,854 | B1* | 9/2017 | Bao | G06F 9/5022 |
| 2005/0232285 | A1* | 10/2005 | Terrell | H04L 67/1097 |
| | | | | 370/401 |
| 2011/0222439 | A1* | 9/2011 | Long | H04L 12/4633 |
| | | | | 370/255 |
| 2012/0120964 | A1* | 5/2012 | Koponen | H04L 41/0816 |
| | | | | 370/409 |
| 2015/0100560 | A1* | 4/2015 | Davie | H04L 45/16 |
| | | | | 707/703 |
| 2015/0146570 | A1* | 5/2015 | Kaivosoja | G06F 16/24 |
| | | | | 370/254 |
| 2015/0169457 | A1* | 6/2015 | Jackson | G06F 12/121 |
| | | | | 711/135 |
| 2016/0352613 | A1* | 12/2016 | Narayanan | H04L 45/021 |
| 2017/0005888 | A1* | 1/2017 | Kallio | H04L 43/0817 |

* cited by examiner

*Primary Examiner* — Moustafa M Meky
*Assistant Examiner* — Kidest Mendaye
(74) *Attorney, Agent, or Firm* — Harrity & Harrity, LLP

(57) ABSTRACT

A device may include one or more processors. The device may receive an instruction identifying a set of objects to be generated by a kernel associated with the device. The kernel may generate the set of objects based on receiving information identifying a corresponding set of write operations. The device may provide a first message to cause the kernel to perform first operations corresponding to a first subset of objects of the set of objects. The device may receive one or more notifications indicating whether each operation, of the first operations, was successfully performed. The device may determine, based on whether each operation was successfully performed, a quantity of objects to include in a second subset of objects, of the set of objects. The device may provide a second message to cause the kernel to perform second operations corresponding to the second subset of objects.

20 Claims, 7 Drawing Sheets

ADAPTIVE BULK WRITE PROCESS

BACKGROUND

A computing device may include an operating system that provides an interface between hardware of the computing device and application processes that are executed by the computing device. The operating system may include a kernel, which may act as an intermediary between the application processes and data processing done at the hardware level. As one example, the kernel may receive a write instruction from an application process to write data to memory, may write the data to memory, and may provide the data to the application based on a read instruction.

SUMMARY

According to some possible implementations, a non-transitory computer-readable medium may store one or more instructions that, when executed by one or more processors, may cause the one or more processors to receive an instruction identifying a set of objects to be generated. The set of objects may be generated based on a corresponding set of write operations to be performed with regard to a memory of the network device. An object, of the set of objects, may include information relating to routing network traffic by the network device. The one or more instructions, when executed by the one or more processors, may cause the one or more processors to cause first write operations to be performed. The first write operations may correspond to a first subset of objects of the set of objects. The one or more instructions, when executed by the one or more processors, may cause the one or more processors to receive one or more notifications indicating whether each write operation, of the first write operations, was successfully performed. The one or more instructions, when executed by the one or more processors, may cause the one or more processors to determine, based on whether each write operation was successfully performed, a quantity of objects to include in a second subset of objects of the set of objects. The one or more instructions, when executed by the one or more processors, may cause the one or more processors to cause second write operations to be performed. The second write operations may correspond to the second subset of objects.

According to some possible implementations, a device may include one or more processors. The one or more processors may receive an instruction identifying a set of objects to be generated by a kernel associated with the device. The kernel may generate the set of objects by performing a corresponding set of write operations. The one or more processors may provide a first message to cause the kernel to perform first write operations corresponding to a first subset of objects of the set of objects. The one or more processors may receive one or more notifications indicating whether each write operation, of the first write operations, was successfully performed. The one or more processors may determine, based on whether each write operation was successfully performed, a quantity of objects to include in a second subset of objects, of the set of objects. The one or more processors may provide a second message to cause the kernel to perform second write operations corresponding to the second subset of objects.

According to some possible implementations a method may include receiving, by a device, an instruction identifying a set of objects to be generated. The set of objects may be generated based on a corresponding set of write operations. The method may include causing, by the device, first write operations to be performed. The first write operations may correspond to a first subset of objects of the set of objects. The method may include receiving, by the device, one or more notifications indicating whether each write operation, of the first write operations, was successfully performed. The method may include determining, by the device and based on whether each write operation was successfully performed, a quantity of objects to include in a second subset of objects of the set of objects. The second subset of objects may include more objects than the first subset of objects when each of the first write operations was successfully performed, and may include fewer objects than the first subset of objects when one or more first write operations, of the first write operations, was not successfully performed. The method may include causing, by the device, second write operations, corresponding to the second subset of objects, to be performed.

DETAILED DESCRIPTION

Figure 1A:
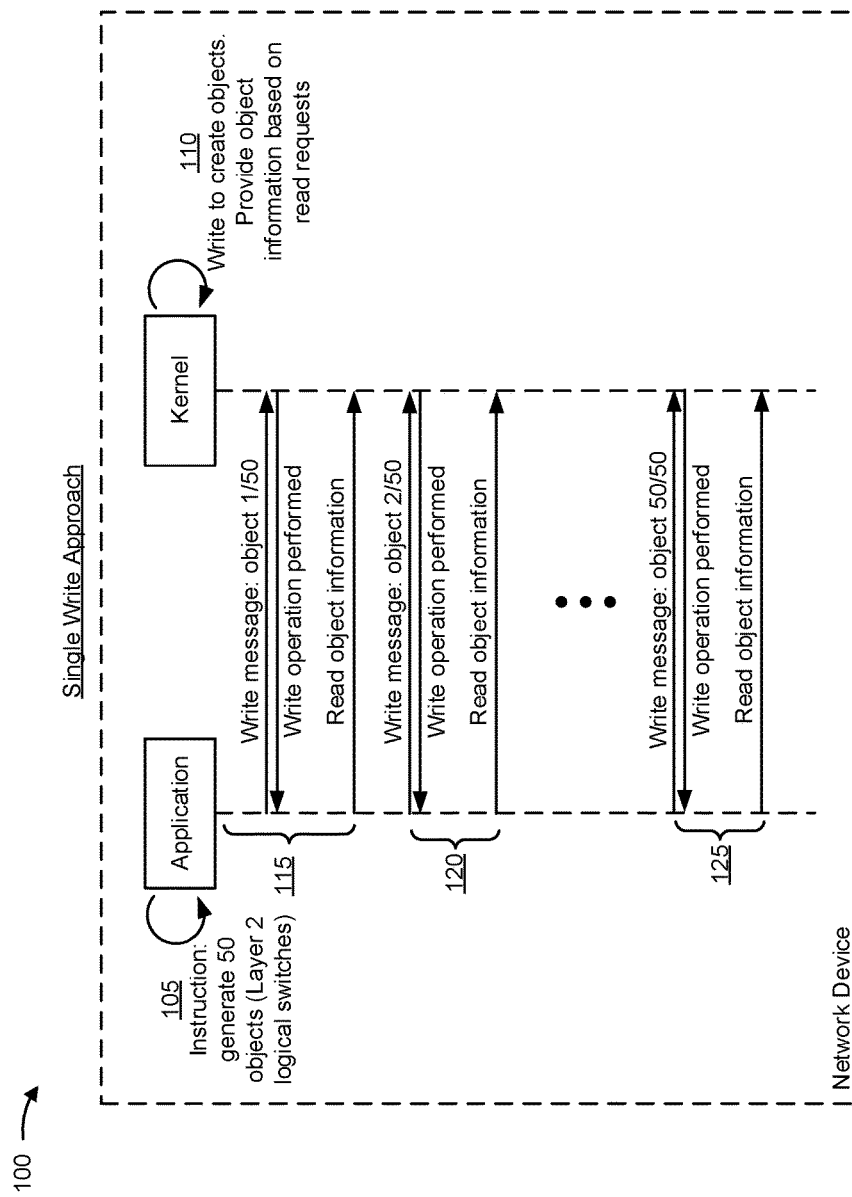
FIGS. 1A-1C are diagrams of an overview of an example implementation described herein.

The following detailed description of example implementations refers to the accompanying drawings. The same reference numbers in different drawings may identify the same or similar elements.

Network devices may route network traffic from a source device to a destination device. In some cases, a set of network devices may need to route network traffic from a variety of source devices to a variety of destination devices. To route the network traffic (e.g., without malicious parties reading the network traffic, without commingling network traffic associated with different entities, etc.), the set of network devices may establish logical networks. A logical network may define how the network devices communicate to route network traffic through the physical layer (e.g., layer 1 of the Open Systems Interconnect (OSI) model). For example, the set of network devices may establish a first logical network for a first entity, a second logical network for a second entity, and so on.

A logical network may include, for example, a layer 2 bridge domain (e.g., the data link layer of the OSI model), a virtual extensible local area network (VXLAN), or the like, and may be implemented using one or more logical switches. A logical switch may identify parameters relating to network traffic (e.g., based on a source of the network traffic, a destination of the network traffic, information associated with the network traffic, etc.) and may identify a logical network (e.g., based on network devices, physical ports of network devices, virtual ports of network devices, etc.) on which to route network traffic that matches the parameters. Logical switches, logical networks (e.g., bridge domains, VXLANs, etc.), and the like, may be referred to herein as "objects." However, the definition of "object" is not limited to the context of logical switches, logical networks, and the like. For example, an object may include any type of data to be written by a kernel based on an instruction from an application.

In some cases, a network device may need to generate a large quantity of objects (e.g., logical switches, logical networks, etc.). For example, when implementing logical networks in an enterprise setting, a network device may need to generate a large quantity (e.g., hundreds, thousands, hundreds of thousands, etc.) of logical networks and/or logical switches in a resource-efficient manner. To generate the large quantity of objects, an operating system of the network device may perform write operations to define the objects in memory. For example, an application of the operating system (e.g., a user-facing application, a process, a daemon, etc.) may provide a message identifying a write operation to cause a kernel of the operating system to access memory and store information defining an object, and may access the object by causing the kernel to perform a read operation. In some implementations, the kernel may generate the object by performing the write operation identified by the message. When the kernel provides information indicating that the write operation is successful, the application may determine that the object was successfully generated.

When generating a large quantity of objects, the application may generate a queue of objects, and may cause the kernel to iteratively perform a write operation for (e.g., may provide write operations corresponding to) each object in the queue. In some cases, the application may cause the kernel to perform a read operation after providing a write operation for an object. In this way, the application prevents the kernel from being overloaded by write operations (e.g., based on kernel resources being limited). However, providing a single write operation to the kernel at a time may be time consuming and may not fully utilize resources associated with the kernel.

The application may save time and processing resources by providing a bulk write message that identifies a set of write operations, to cause the kernel to consecutively generate a corresponding set of objects. However, in some cases, the kernel may fail to generate every one of the set of objects (e.g., based on a load at the kernel, based on other tasks to be performed by the kernel, etc.). For example, the kernel may be associated with limited resources (e.g., processor, storage, etc.) and/or threads, and may need to allocate the resources and/or threads among multiple processes. In such a case, the application may provide another write message that identifies the write operations that the kernel originally failed to perform, which consumes processor resources for redundant requests. Furthermore, as the load associated with the kernel changes during operation, a quantity of objects that can be generated based on a single bulk write message may change unpredictably (e.g., may increase, may decrease, etc.).

Implementations described herein enable the application of the network device to provide bulk write messages to cause the kernel to generate sets of objects, which saves time and processor resources as compared to generating one object at a time based on a queue. The application may change a quantity of write operations identified in each bulk write message based on a result of a previous bulk write message (e.g., may increase the quantity when every write operation associated with the previous bulk write message is successfully performed, may decrease the quantity when one or more write operations are not successfully performed, etc.). In this way, the application conserves processor resources and reduces an amount of time required to generate large quantities of objects.

Notably, while techniques described herein are described in the context of objects relating to logical switches and/or logical networks, these techniques may be applied to other situations involving a kernel performing bulk write operations based on instructions from an application whether inside of or outside of the networking context. In addition, while techniques are described as being performed by a network device, these techniques may be performed by another type of device, such as a computing device, a storage device, or the like.

Figure 1B:
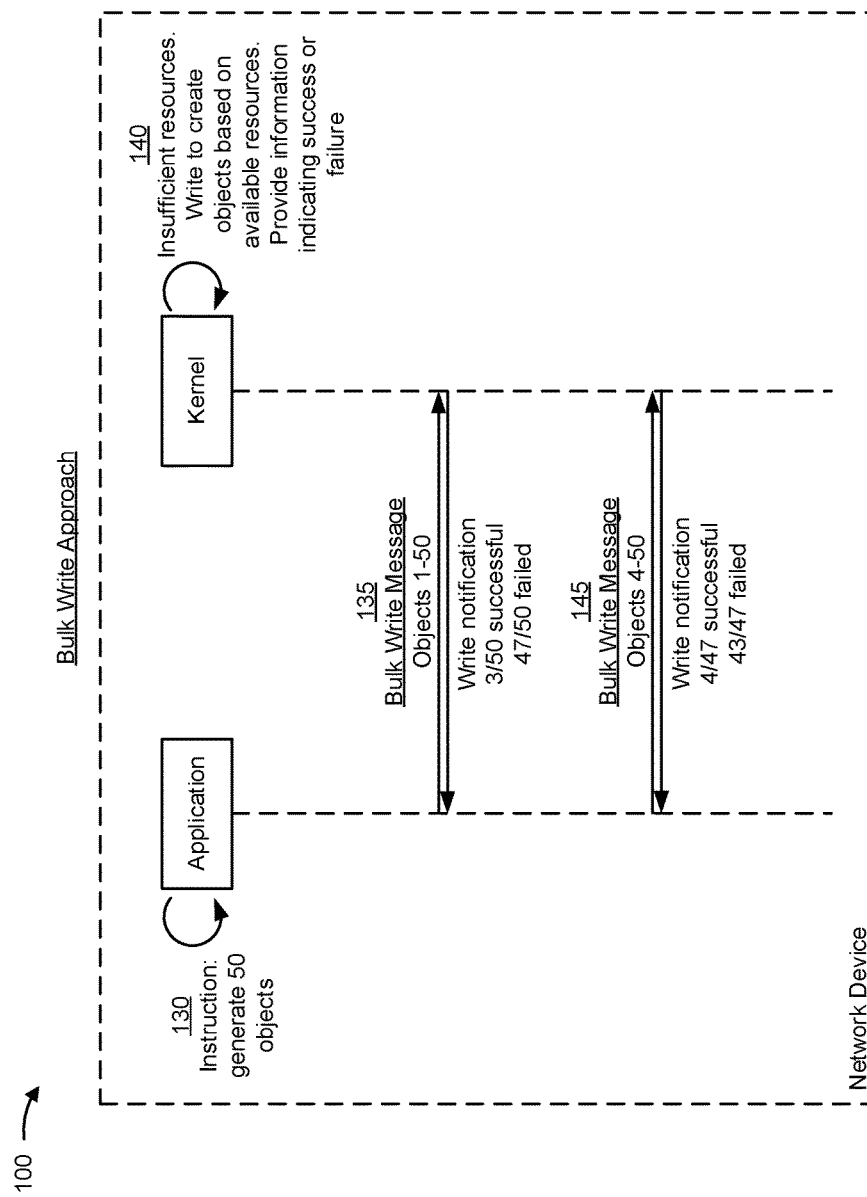
Figure 1C:
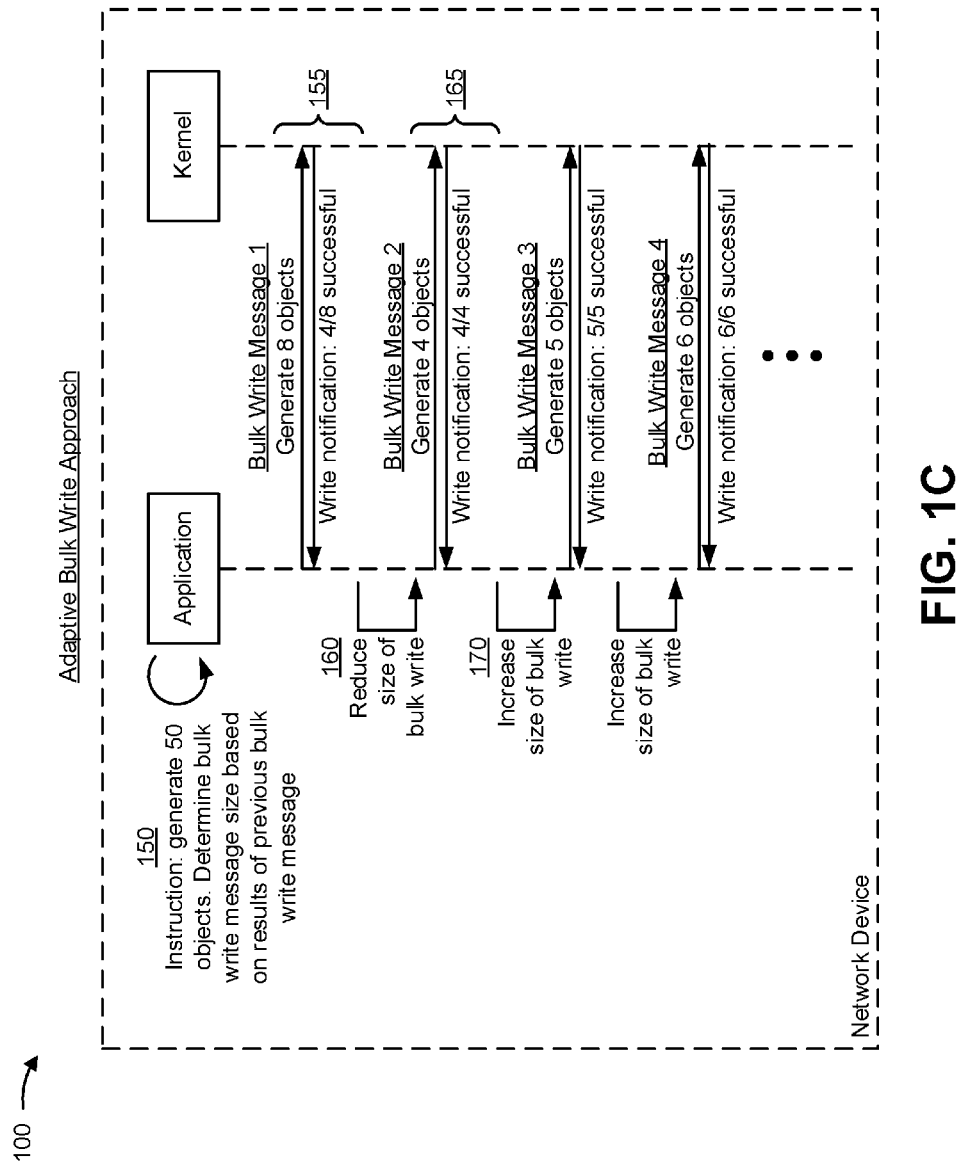

FIGS. 1A-1C are diagrams of an overview of an example implementation 100 described herein. FIGS. 1A and 1B show examples of a single write approach and a bulk write approach. FIG. 1C shows an example implementation of an adaptive bulk write approach, as described in more detail in connection with FIG. 5, below.

FIG. 1A shows an example of a single write approach for generating objects. As shown in FIG. 1A, and by reference number 105, an application may receive an instruction to generate 50 objects (e.g., 50 Layer 2 logical switches). As shown by reference number 110, to generate the objects, a kernel of the network device may perform write operations. As further shown, the kernel may provide object information relating to generated objects based on receiving read requests from the application.

As shown by reference number 115, when performing the single write approach, the application may provide a first write message to cause the kernel to perform a first write operation to generate a first object (e.g., object 1/50), and may receive a notification, from the kernel, indicating that the kernel performed the first write operation. As shown, after causing the kernel to generate the first object, the application may provide a read request to obtain object information describing the first object (e.g., to prevent the application from providing a second write message prematurely, thereby causing the kernel to fail to perform a second write operation). Assume that the application receives the object information from the kernel.

As shown by reference number 120, after providing the first read request, the application may provide a second write message, and may receive a corresponding notification indicating that the kernel performed the second write operation. As further shown, the application may provide a read request to obtain object information describing the second object. As shown by reference number 125, the application may perform similar operations for each object of the 50 objects. However, the application may expend processor resources and/or time that can otherwise be used by the kernel to generate multiple objects based on bulk write messages.

FIG. 1B shows an example of a bulk write approach for generating objects. For the purpose of FIG. 1B, assume that the operations described in connection with FIG. 1A have not been performed. As shown in FIG. 1B, and by reference number 130, the application may receive an instruction to generate 50 objects. As shown by reference number 135, the application may provide a bulk write message to the kernel. A bulk write message may identify a set of write operations to perform, corresponding to a set of objects to be generated. In some implementations, a bulk write message may include one or more messages.

As shown, the bulk write message may cause the kernel to attempt to perform write operations corresponding to each object of the 50 objects. As shown by reference number 140, the kernel may have insufficient resources to perform write operations for each object of the 50 objects. Therefore, the kernel may perform write operations based on available resources at the kernel, and may provide notifications indicating whether each write operation was successful or unsuccessful. As shown, the kernel generates objects based on 3 write operations and fails to generate objects based on 47 write operations.

As shown by reference number 145, the application may provide a second bulk write message to cause the kernel to generate a remainder of the 50 objects. As further shown, the kernel may generate 4 objects of a remaining 47 objects. Notably, the quantity of objects generated in connection with reference number 135 is different than the quantity of objects generated in connection with reference number 145 (e.g., based on load and/or available resources associated with the kernel being unpredictable). In this way, the network device expends processor resources by generating bulk write messages without accounting for a likelihood of success of objects associated with the bulk write messages.

FIG. 1C shows an example of an adaptive bulk write process for generating objects. For the purpose of FIG. 1C, assume that the operations described in connection with FIGS. 1A and 1B have not been performed. As shown in FIG. 1C, and by reference number 150, the application may receive an instruction to generate 50 objects. As shown, the network device may determine a size of a bulk write message based on a result of a previous bulk write message. Assume that the application provided the previous bulk write message in connection with another set of objects other than the 50 objects.

As shown by reference number 155, the application may provide a first bulk write message (e.g., Bulk Write Message 1) identifying 8 first objects to create (e.g., based on 8 first write messages). The application may determine a quantity of write operations to include in the first bulk write message based on the previous bulk write message, based on a default value for the first bulk write message, based on a buffer size associated with the kernel, or the like.

As further shown, the kernel may provide a notification indicating that the kernel generated 4 objects of the 8 first objects. For example, the kernel may be associated with resources that are sufficient to generate objects corresponding to 4 write operations, and not to generate objects after the 4 write operations.

As shown by reference number 160, based on the notification, the application may reduce a quantity of write operations identified by a second bulk write message. As shown by reference number 165, the second bulk write message (e.g., Bulk Write Message 2) may identify 4 second objects, of the 50 objects, to generate. The second bulk write message may identify the 4 second objects based on the first bulk write message causing the kernel to successfully generate objects corresponding to 4 write operations. For example, the application may determine the quantity for the second bulk write message based on a quantity of successfully generated objects from the first bulk write message (e.g., a same quantity as the quantity of successfully generated objects, a quantity of one more than the successfully generated objects, a quantity of one less than the quantity of successfully generated objects, or the like). As further shown, the kernel successfully generates objects corresponding to each write operation identified by the second bulk write message.

As shown by reference number 170, based on the kernel successfully generating objects based on the second write operations, the application may increase a quantity of write operations identified by a third bulk write message (e.g., Bulk Write Message 3). Here, the application increases the quantity of write operations by 1. As further shown, the third bulk write message may identify third write operations corresponding to 5 objects of the 50 objects. As shown, the kernel may successfully generate objects based on the third write operations (e.g., based on additional resources becoming available since the second bulk write message was provided, based on a load associated with the kernel decreasing since the second bulk write message was provided, etc.). As further shown, based on the kernel successfully generating the objects based on the third write operations, the application may increase a quantity of write operations identified by a fourth bulk write message, and the kernel may successfully generate 6 objects based on the fourth bulk write message.

In this way, a network device conserves processor resources and reduces an amount of write messages and time used to generate objects.

As indicated above, FIGS. 1A-1C are provided merely as an example. Other examples are possible and may differ from what was described with regard to FIGS. 1A-1C.

Figure 2:
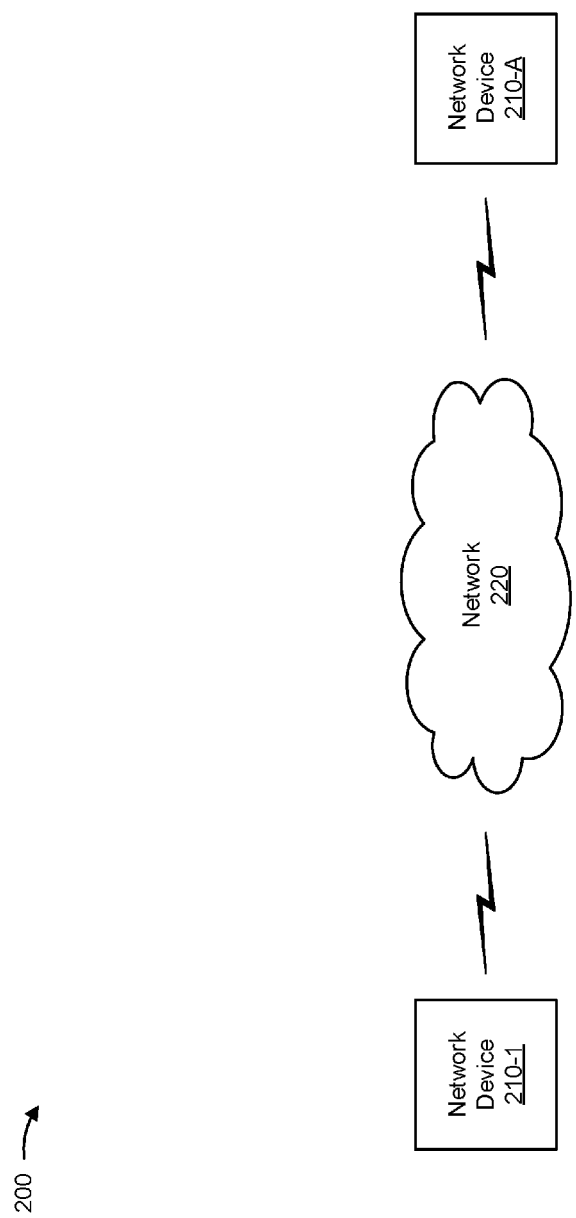
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-A (A≥1) (hereinafter referred to collectively as "network devices 210," and individually as "network device 210") and a network 220. Devices of environment 200 may interconnect via wired connections, wireless connections, or a combination of wired and wireless connections.

Network device 210 may include a device capable of receiving, transmitting, processing, and/or routing, etc. packets travelling via network 220. For example, network device 210 may include a switch, a router, a server, a gateway, a modem, a firewall, a hub, a bridge, a reverse proxy, a security device, an intrusion detection device, a load balancer, or another type of device included in network 220. In some implementations, network device 210 may include one or more input ports associated with receiving packets and one or more output ports associated with transmitting packets. In some implementations, network device 210 may be included in network 220.

Network 220 may include one or more wired and/or wireless networks that include one or more network devices 210. For example, network 220 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks. In some implementations, network 220 may include a layer 2 network (e.g., a data link layer network) and/or a layer 3 network (e.g., a network layer network).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
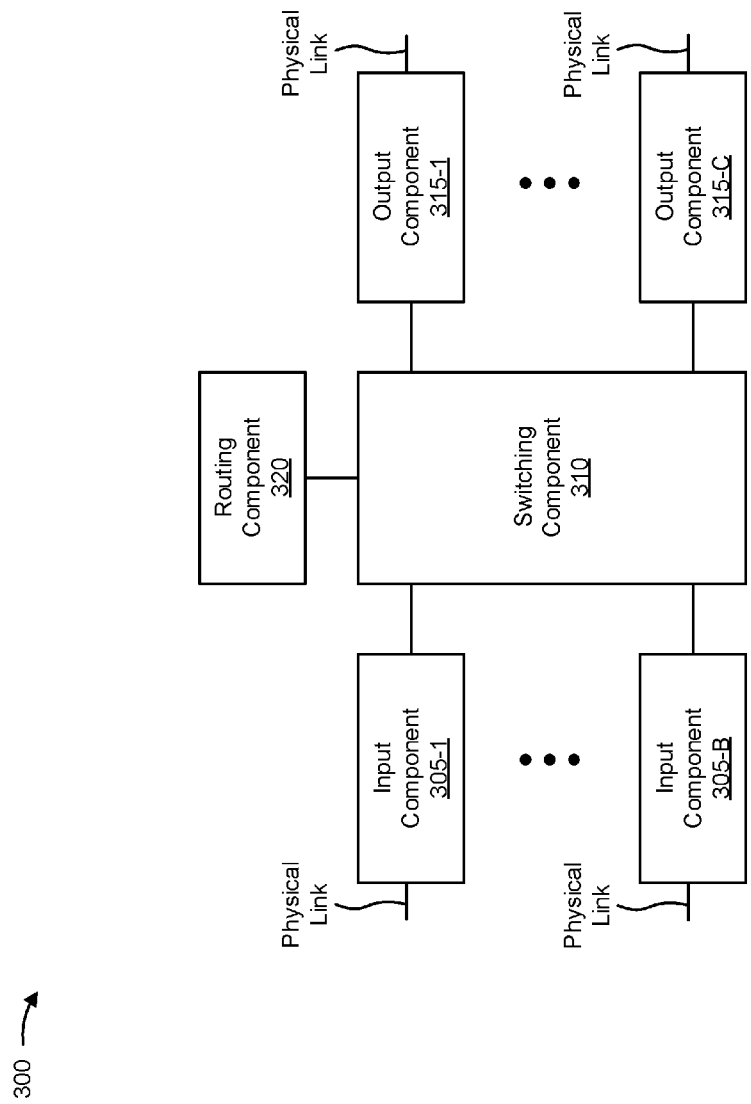
FIG. 3 is a diagram of example components of one or more devices of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C(C≥1) (hereinafter referred to collectively as output components 315, and individually as output component 315), and a routing component 320.

Input component 305 may be a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 may interconnect input components 305 with output components 315. Switching component 310 may be implemented using one or more of multiple, different techniques. For example, switching component 310 may be implemented via busses, via crossbars, and/or with shared memories. The shared memories may act as temporary buffers to store traffic from input components 305 before the traffic is eventually scheduled for delivery to output components 315. In some implementations, switching component 310 may enable input components 305, output components 315, and/or routing component 320 to communicate.

Output component 315 may be a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (i.e., an input/output component may be a combination of input component 305 and output component 315).

Routing component 320 includes a processor in the form of, for example, a central processing unit (CPU), a microprocessor, a field-programmable gate array (FPGA), an application-specific integrated circuit (ASIC), and/or another type of processor that can interpret and/or execute instructions. Routing component 320 is implemented in hardware, firmware, or a combination of hardware and software. In some implementations, routing component 320 may include one or more processors that can be programmed to perform a function.

In some implementations, routing component 320 may include a random access memory (RAM), a read only memory (ROM), and/or another type of dynamic or static storage device (e.g., a flash memory, a magnetic memory, an optical memory, etc.) that stores information and/or instructions for use by routing component 320.

In some implementations, routing component 320 may communicate with other devices, networks, and/or systems connected to device 300 to exchange information regarding network topology. Routing component 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Routing component 320 may perform one or more processes described herein. Routing component 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with routing component 320 from another computer-readable medium or from another device via a communication interface. When executed, software instructions stored in a memory and/or a storage component associated with routing component 320 may cause routing component 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
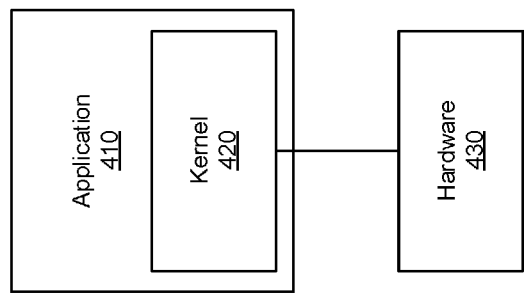
FIG. 4 is a diagram of example functional components of a network device depicted in FIG. 2.

FIG. 4 is a diagram of example functional components of network device 210. As shown in FIG. 4, network device 210 may include an application 410, a kernel 420, and hardware 430. In some implementations, these functional components may be located in input component 205, switching component 310, output component 315, or routing component 320. In some implementations, these functional components may be located in two or more of input component 205, switching component 310, output component 315, and/or routing component 320.

Application 410 may perform operations related to configuring and/or operating network device 210 (e.g., hardware 430 of network device 210). For example, application 410 may include an operating system that permits network device 210 to be configured and/or operated according to particular parameters. In some implementations, application 410 may include elements (e.g., processes, daemons, modules, etc.) that manage operations performed by kernel 420 and/or network device 210. For example, application 410 may include a routing protocol element that manages routing protocols, a device control element that controls interfaces (e.g., input component 305, output component 315, etc.), a chassis element that manages hardware 430, or the like. In some implementations, application 410 may include or be associated with kernel 420.

Kernel 420 may perform operations related to accessing components of network device 210 (e.g., hardware components, firmware components, etc.). In other words, kernel 420 may act as an intermediary between application 410 and hardware 430. For example, kernel 420 may receive instructions from application 410, may perform operations with regard to hardware and/or firmware components of network device 210 based on the instructions, and may provide notifications indicating results of the operations (e.g., to application 410, to memory that application 410 can read, etc.). In some implementations, kernel 420 may allocate system resources (e.g., processor resources, storage resources, input/output resources, etc.) to perform operations based on instructions received from application 410. In some implementations, kernel 420 may receive input and/or provide output based on an asynchronous input/output (asynchronous I/O) process.

Hardware 430 may include hardware and/or firmware components of network device 210. For example, hardware 430 may include the devices and/or components described in connection with device 300, above. Hardware 430 may perform processing, storage, routing, switching, filtering, etc. operations based on configuration information provided by kernel 420 via application 410.

The number and arrangement of functional components shown in FIG. 4 are provided as an example. In practice, network device 210 may include additional functional components, fewer functional components, different functional components, or differently arranged functional components than those shown in FIG. 4. Additionally, or alternatively, a set of functional components (e.g., one or more functional components) of network device 210 may perform one or more functions described as being performed by another set of functional components of network device 210.

Figure 5:
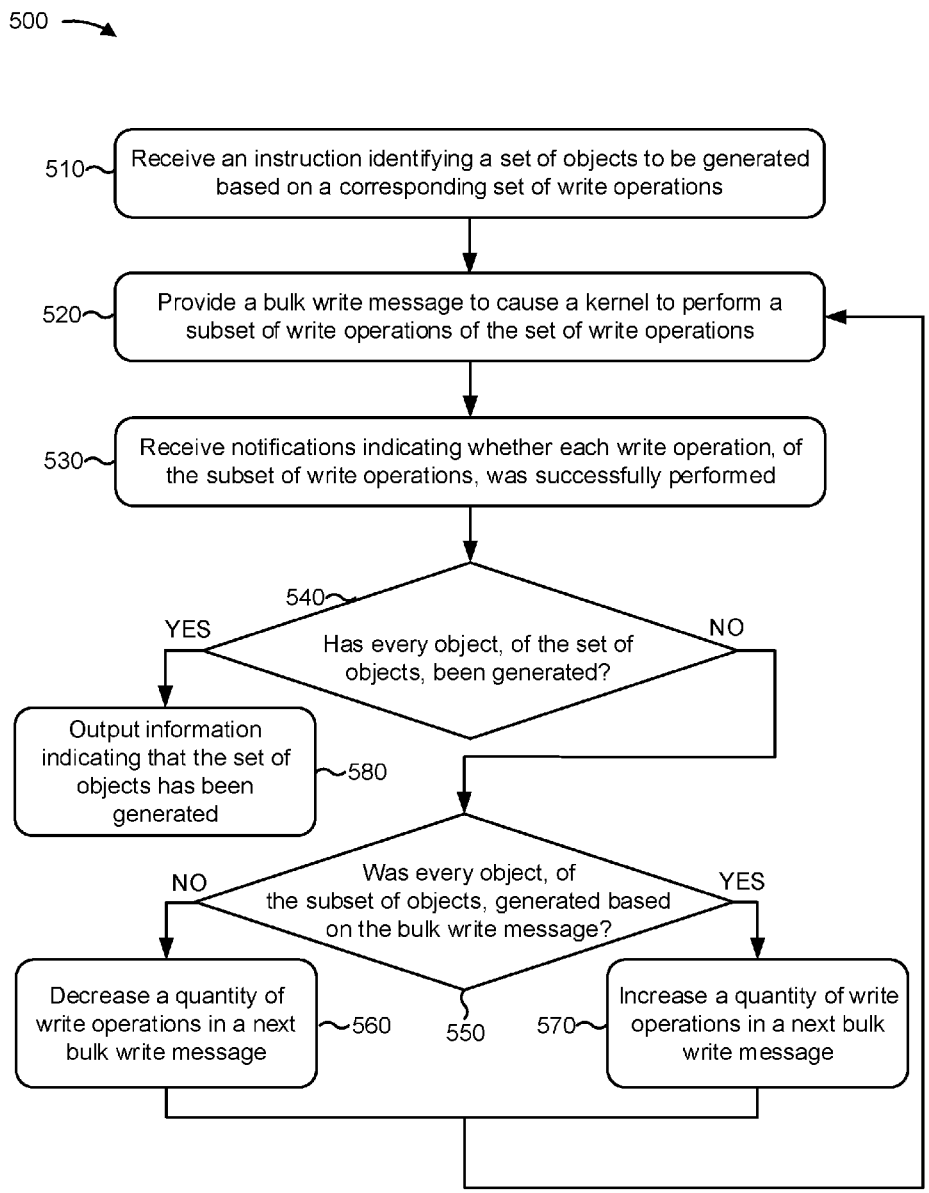
FIG. 5 is a diagram of an example process for performing an adaptive bulk write process.

FIG. 5 is a flow chart of an example process 500 for performing an adaptive bulk write process. In some implementations, one or more process blocks of FIG. 5 may be performed by network device 210.

As shown in FIG. 5, process 500 may include receiving an instruction identifying a set of objects to be generated based on a corresponding set of write operations (block 510). For example, application 410 (e.g., application 410 of network device 210) may receive an instruction identifying a set of objects to be generated (e.g., layer 2 logical switches, layer 2 bridge domains, VXLANs, etc.). In some implementations, application 410 may receive the instruction based on an instruction from another device (e.g., a network management device, etc.), from a user (e.g., based on a user input, such as a command line input, a user interface input, etc.), from another component of network device 210, or the like.

In some implementations, the instruction may identify a set of objects to be generated. For example, the instruction may identify parameters defining one or more objects to create (e.g., parameters such as information identifying network addresses, network devices 210, virtual devices, physical devices, rules, a unicast/multicast parameter relating to transferring network traffic between network devices 210, etc.). Additionally, or alternatively, application 410 may determine particular objects to create based on the instruction. For example, the instruction may include one or more parameters relating to creating one or more logical networks (e.g., a virtual extensible LAN (VXLAN), a bridge domain, etc.), such as paths associated with the one or more logical networks, network traffic to be routed via the one or more logical networks, one or more identifiers associated with the one or more logical networks, or the like, and application 410 may determine objects to generate based on the instruction.

In some implementations, the set of objects may include a large quantity of objects (e.g., 50 objects, 100 objects, 1,000 objects, 10,000 objects, 64,000 objects, or a different quantity of objects). To cause kernel 420 to generate the set of objects, application 410 may provide a bulk write message to kernel 420 identifying write operations to generate the set of objects or a subset of the set of objects. However, kernel 420 may fail to generate every object of the set when the bulk write message identifies a quantity of objects that is too large for kernel 420 to handle, as described in more detail below.

As further shown in FIG. 5, process 500 may include providing a bulk write message to cause a kernel to generate a subset of objects of the set of objects (block 520). For example, application 410 may provide a bulk write message to kernel 420. The bulk write message may identify a subset of write operations corresponding to a subset of objects of the set of objects (e.g., a subset that may include each object of the set, a subset that does not include every object of the set, etc.). Based on the bulk write message, kernel 420 may generate some of, or all of, the subset of objects (e.g., logical switches, bridge domains, etc.).

The subset of write operations may include a particular quantity of write operations corresponding to a particular quantity of objects. In some implementations, application 410 may determine the particular quantity based on a default quantity. For example, in a situation where the bulk write message is a first bulk write message for a set of objects, application 410 may include a default quantity of write operations in the subset of write operations. The default quantity may be determined based on, for example, a buffer size of kernel 420, a quantity of write operations successfully performed with regard to a different set of objects, an average quantity of write operations successfully performed by the kernel, a user input, or the like.

In some implementations, application 410 may determine the particular quantity based on a quantity associated with a previous iteration of the adaptive bulk write process. For example, application 410 may iteratively provide bulk write messages to kernel 420 until kernel 420 has generated each object of a set of objects. When kernel 420 fails to generate every object associated with a bulk write message in a particular iteration, application 410 may decrease a quantity of write operations associated with a next bulk write message corresponding to a next iteration, as described in more detail below.

When kernel 420 successfully generates every object corresponding to every write operation identified by a bulk write message, application 410 may increase a quantity of write operations in a next bulk write message corresponding to a next iteration, as described in more detail below. In this way, application 410 reduces a quantity of bulk write messages needed to generate a set of objects, which conserves processor resources of network device 210 and saves time when implementing logical networks.

As further shown in FIG. 5, process 500 may include receiving notifications indicating whether each write operation, of the subset of write operations, was successfully performed (block 530). For example, application 410 may receive notifications indicating whether kernel 420 successfully generated objects based on each write operation identified by the bulk write message. Kernel 420 may attempt to generate objects based on each write operation identified by the bulk write message, and may succeed or fail with respect to zero or more write operations or all of the write operations.

Kernel 420 may provide one or more notifications to application 410 identifying a result of each generation/write operation. In some implementations, kernel 420 may provide a single notification covering all generations/write operations identified by the bulk write message. In some implementations, kernel 420 may provide a separate notification for each of the generations/write operations identified by the bulk write message.

Kernel 420 may fail to generate an object and/or perform a write operation due to a lack of buffer space, a lack of processor resources, an interruption from another process, or the like. For example, kernel 420 may receive instructions from multiple, different processes of application 410 (or multiple, different applications 410), and may perform operations based on the instructions. In a situation where kernel 420 is in the midst of performing a set of operations and receives a different instruction, kernel 420 may halt operations with regard to the set of objects, and may perform the operations identified by the different instruction (e.g., immediately upon receiving the different instruction, after a particular quantity of processor cycles, etc.). This may cause some of the set of operations (e.g., operations that were to be performed after the different instruction was received) to fail.

As further shown in FIG. 5, process 500 may include determining whether every object, of the set of objects, has been generated (block 540). For example, application 410 may determine whether every object, of the set of objects, has been generated. Application 410 may determine whether the set of objects has been generated based on one or more notifications received from kernel 420 (e.g., one or more notifications received in connection with a most recent bulk write message, one or more notifications received in connection with each bulk write message pertaining to a set of objects, etc.). For example, application 410 may determine whether application 410 has received a notification indicating that a corresponding write operation for each object, of the set of objects, was successful. In a situation where each write operation was successful, application 410 may determine that kernel 420 has generated every object of the set of objects. In a situation where one or more write operations was not successful, application 410 may determine that kernel 420 has not generated one or more corresponding objects.

As further shown in FIG. 5, if not every object, of the set of objects, has been generated (block 540—NO), process 500 may include determining whether every object, of the subset of objects, was generated based on the bulk write message (block 550). For example, in some cases, application 410 may determine that not every object, of the set of objects, has been generated successfully. In some cases, application 410 may have yet to provide bulk write messages corresponding to one or more objects of the set of objects. For example, application 410 may have yet to perform one or more iterations of the adaptive bulk write process. Additionally, or alternatively, kernel 420 may fail to generate one or more corresponding objects based on one or more write operations, and application 410 may determine that the set of objects has not been generated based on notifications indicating that the one or more write operations have failed.

As further shown in FIG. 5, if not every object, of the subset of objects, was generated based on the bulk write message (block 550—NO), process 500 may include decreasing a quantity of write operations in a next bulk write message (block 560) and returning to block 520. For example, the subset of objects may include a particular quantity of objects. When kernel 420 fails to generate one or more objects of the subset of objects, application 410 may determine that a size of the subset (e.g., a quantity of write operations corresponding to objects included in the subset) is to be decreased in a next bulk write message. Kernel 420 may decrease the quantity of write operations identified in the next bulk write message, and may provide the next bulk write message (e.g., as described in connection with block 520). By decreasing the quantity of write operations in the next bulk write message, application 410 improves a likelihood that each object identified by the next bulk write message is successfully generated, which conserves processor resources and time. In this way, application 410 adapts to changing resource availability associated with kernel 420.

In some implementations, application 410 may decrease the quantity by one, may decrease the quantity to a particular quantity (e.g., to an average quantity of two or more previous successful bulk write messages, to a moving average value of successful bulk write messages, to a quantity specified by a user, etc.), or the like. In some implementations, application 410 may decrease the quantity based on a quantity of objects, of the subset of objects, that were successfully generated. For example, if a particular bulk write message identifies 6 write operations, and kernel 420 successfully generates 4 objects based on the particular bulk write message, application 410 may decrease the quantity in the next bulk write message to 4 write operations/objects. In this way, application 410 iteratively determines quantities of write operations to include in bulk write messages, which conserves processor resources and improves performance of network device 210 when generating objects.

As further shown in FIG. 5, if every object, of the subset of objects, was generated based on the bulk write message (block 550—YES), process 500 may include increasing a quantity of write operations in a next bulk write message (block 570) and returning to block 520. For example, in some cases, kernel 420 may successfully generate every object identified by a bulk write message (e.g., based on write messages corresponding to the objects identified by the bulk write message). In such cases, application 410 may determine that kernel 420 is associated with resources that are at least sufficient for the quantity of write operations identified by the bulk write message, and may accordingly increase the quantity in a next bulk write message. Application 410 may provide the next bulk write message, as described in connection with block 520. In this way, application 410 iteratively provides bulk write messages and adjusts quantities of write operations identified in the bulk write messages, which conserves processor resources and reduces time required to generate objects.

In some implementations, application 410 may increase the quantity by one, may increase the quantity to a particular quantity (e.g., an average quantity of two or more previous successful bulk write messages, a moving average of two or more previous successful bulk write messages, a quantity specified by a user, etc.), or the like. In this way, application 410 iteratively determines quantities of write operations to identify in bulk write messages, which conserves processor resources and improves performance of network device 210 when generating objects.

As further shown in FIG. 5, if every object, of the set of objects, has been generated (block 540—YES), process 500 may include outputting information indicating that the set of objects has been successfully generated (block 580). For example, application 410 may determine that kernel 420 has generated every object of the set of objects. Application 410 may provide information indicating that kernel 420 has successfully generated the set of objects. For example, application 410 may provide a notification to a user, may provide a notification to another device (e.g., a network management device, etc.), may provide a notification to another component of network device 210, or the like. In some implementations, network device 210 that hosts application 410 may provide information to other network devices 210 (e.g., information identifying the set of objects, information identifying logical networks defined based on the set of objects, etc.). In some implementations, application 410 may cause network device 210 to implement the set of objects and/or to route network traffic based on the set of objects.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, a network device conserves processor resources and reduces an amount of write messages and time used to generate objects.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A non-transitory computer-readable medium storing instructions, the instructions comprising:
    one or more instructions that, when executed by one or more processors of a network device, cause the one or more processors to:
        receive an instruction identifying a plurality of objects to be generated,
            the plurality of objects relating to one or more of:
                a logical switch, or
                a logical network, and
            the plurality of objects being generated based on a corresponding plurality of operations to be performed with regard to a memory of the network device, and
            an object, of the plurality of objects, including information relating to routing network traffic by the network device;
        determine a plurality of write operations associated with the plurality of objects;
        cause first operations to be performed to generate a first subset of objects of the plurality of objects by providing, to a kernel of the network device, a first message identifying first write operations, of the plurality of write operations, corresponding to the first subset of objects;
        receive one or more notifications indicating whether each operation, of the first operations, was successfully performed;
        determine, based on whether each operation was successfully performed, a quantity of objects to include in a second subset of objects of the plurality of objects; and
        cause second operations to be performed to generate the second subset of objects by providing, to the kernel, a second message identifying second write operations, of the plurality of write operations, corresponding to the second subset of objects.

2. The non-transitory computer-readable medium of claim 1, where the plurality of objects relate to one or more of:
    a Layer 2 logical switch,
    a Layer 2 bridge domain, or
    a virtual extensible local area network.

3. The non-transitory computer-readable medium of claim 1, where the first subset of objects includes a first quantity of objects and where the quantity of objects included in the second subset of objects is a second quantity of objects; and
    where operations corresponding to a third quantity of objects, of the first quantity of objects, are not successfully performed; and
    where the one or more instructions, that cause the one or more processors to determine the second quantity of objects, cause the one or more processors to:
        determine the second quantity based on subtracting the third quantity of objects from the first quantity of objects.

4. The non-transitory computer-readable medium of claim 1, where the one or more instructions, that cause the one or more processors to determine the quantity of objects to include in the second subset of objects, cause the one or more processors to:
    determine that each operation, of the first operations, was successfully performed; and determine the quantity of objects to include in the second subset of objects to cause the second subset of objects to include one additional object than the first subset of objects.

5. The non-transitory computer-readable medium of claim 1, where the one or more instructions, when executed by the one or more processors, further cause the one or more processors to:
   determine that each object, of the plurality of objects, has been generated; and
   provide information describing the plurality of objects.

6. The non-transitory computer-readable medium of claim 5, where the one or more instructions, when executed by the one or more processors, further cause the one or more processors to:
   provide a read message to the kernel to obtain the information; and
   receive the information based on providing the read message.

7. The non-transitory computer-readable medium of claim 1, where the one or more instructions, when executed by the one or more processors, further cause the one or more processors to:
   determine that each object, of the plurality of objects, has been generated; and
   output information indicating that the plurality of objects have been successfully generated.

8. A device, comprising:
   one or more memories; and
   one or more processors, communicatively couple to the one or more memories, to:
      receive an instruction identifying a plurality of objects to be generated by a kernel associated with the device,
         the plurality of objects relating to one or more of:
            a logical switch, or
            a logical network, and
         the kernel generating the plurality of objects based on receiving information identifying a corresponding plurality of write operations;
      provide a first message to cause the kernel to perform first operations corresponding to a first subset of objects of the plurality of objects,
         the first message identifying first write operations, of the plurality of write operations, corresponding to the first subset of objects;
      receive one or more notifications indicating whether each operation, of the first operations, was successfully performed;
      determine, based on whether each operation was successfully performed, a quantity of objects to include in a second subset of objects, of the plurality of objects; and
      provide a second message to cause the kernel to perform second operations corresponding to the second subset of objects,
         the second message identifying second write operations, of the plurality of write operations, corresponding to the second subset of objects.

9. The device of claim 8, where the one or more processors, when determining the quantity of objects, are to:
   determine that one or more operations, of the first operations, was not performed; and
   determine the quantity of objects to include in the second subset of objects based on the one or more operations not being performed,
      the second subset of objects including fewer objects than the first subset of objects.

10. The device of claim 8, where the one or more processors, when determining the quantity of objects, are to:
    determine that each operation, of the first operations, was performed; and
    determine the quantity of objects to include in the second subset of objects based on each of the first operations being performed,
       the second subset of objects including a greater quantity of objects than the first subset of objects.

11. The device of claim 8, where the one or more processors, when receiving the one or more notifications, are to:
    determine that one or more of the first operations corresponding to one or more objects were not successfully performed; and
    where the one or more processors, when providing the second message, are to:
       include, in the second subset of objects, the one or more objects.

12. The device of claim 8, where the one or more processors, when receiving the one or more notifications, are to:
    receive a plurality of notifications,
       each notification, of the plurality of notifications, corresponding to a different operation of the first operations.

13. The device of claim 8, where the plurality of objects relate to one or more of:
    a Layer 2 logical switch,
    a Layer 2 bridge domain, or
    a virtual extensible local area network.

14. The device of claim 8, where the one or more processors are to: include, in the first subset of objects, a particular quantity of objects,
    the particular quantity of objects being determined based on results of one or more previous write operations,
       the one or more previous write operations occurring before the first operations.

15. A method, comprising:
    receiving, by a device, an instruction identifying a plurality of objects to be generated,
       the plurality of objects relating to one or more of:
          a logical switch, or
          a logical network, and
       the plurality of objects being generated based on a corresponding plurality of write operations;
    determining, by the device, a plurality of write operations associated with to the plurality of objects;
    causing, by the device, first operations to be performed to generate a first subset of objects of the plurality of objects by providing, to a kernel associated with the device, a first message identifying first write operations, of the plurality of write operations, corresponding to the first subset of objects;
    receiving, by the device, one or more notifications indicating whether each object, of the first subset of objects, was successfully generated;
    determining, by the device and based on whether each object was successfully generated, a quantity of objects to include in a second subset of objects of the plurality of objects,
       the second subset of objects including more objects than the first subset of objects when each first object was successfully generated, and the second subset of objects including fewer objects than the first subset of objects when one or more objects, of the first subset of objects was not successfully generated; and causing, by the device, second operations, corresponding to the second subset of objects, to be performed to generate the second subset of objects by providing, to the kernel, a second message identifying second write operations, of the plurality of write operations, corresponding to the second subset of objects.

16. The method of claim 15, where causing the first operations to be performed comprises:

causing the first operations to be performed by the kernel; and where causing the second operations to be performed comprises:

causing the second operations to be performed by the kernel.

17. The method of claim 16, where receiving the instruction comprises:

receiving, by an application associated with the device, the instruction; and identifying the plurality of write operations based on the instruction; and where causing the first operations to be performed comprises:

causing, by the application and based on the first write operations, the first operations to be performed by the kernel; and where causing the second operations to be performed comprises:

causing, by the application, the second operations to be performed by the kernel.

18. The method of claim 17, where the application and the kernel are associated with an operating system of the device.

19. The method of claim 15, where the first subset of objects includes a first quantity of objects and where the quantity of objects included in the second subset of objects is a second quantity of objects; and where a third quantity of operations, of the first operations, are not successfully performed; and where determining the second quantity of objects comprises:

determine the second quantity based on subtracting the third quantity from the first quantity.

20. The method of claim 15, where each operation, of the first operations, is successful; and where determining the quantity of objects comprises:

determining the quantity of objects to cause the second subset of objects to include one additional object than the first subset of objects.

* * * * *